(12) United States Patent
Buttigieg

(10) Patent No.: US 7,300,270 B2
(45) Date of Patent: Nov. 27, 2007

(54) APPARATUS FOR INJECTION MOLDING

(75) Inventor: Joseph Buttigieg, Farmington Hills, MI (US)

(73) Assignee: D-M-E Company, Madison Heights, MI (US)

( * ) Notice: Subject to any disclaimer, the term of this patent is extended or adjusted under 35 U.S.C. 154(b) by 199 days.

(21) Appl. No.: 11/193,804

(22) Filed: Jul. 30, 2005

(65) Prior Publication Data

US 2007/0026097 A1    Feb. 1, 2007

(51) Int. Cl.
*B29C 45/84* (2006.01)
*B29C 45/40* (2006.01)

(52) U.S. Cl. .................. 425/173; 425/188; 425/192 R

(58) Field of Classification Search ................ 425/182, 425/188, 190, 192 R, 556, 173; 220/323, 220/328, 241, 242; 264/40.1
See application file for complete search history.

(56) References Cited

U.S. PATENT DOCUMENTS 5,310,332 A * 5/1994 Ito et al. ..................... 425/169

6,814,567 B2    11/2004 McKovich

OTHER PUBLICATIONS

"D-M-E Custom Configured Mold Bases", Sep. 2002, p. 12, D-M-E Company, U.S.A.
"CLOZ-IT Ejector Housing Cover", 1999, p. 2, Superior Die Set Corporation.

* cited by examiner

*Primary Examiner*—Yogendra N. Gupta
*Assistant Examiner*—Emmanuel S Luk
(74) *Attorney, Agent, or Firm*—John W. Gregg

(57) ABSTRACT

A cover for an opening of an ejector housing of a mold assembly comprises a cover portion and a mounting portion, the mounting portion is attached to a member defining the ejector housing at a side thereof comprising an interior wall of the ejector housing and the cover portion covering the opening defined by the ends of the members surrounding the ejector housing. The cover is attached to a side of the member by at least one fastener located so as not to be accessible for removing the housing cover as the mold assembly is mounted in a machine. A mold assembly comprises a cover in accordance with the invention. The cover advantageously comprising at least one opening therethrough to permit guarded examination of components of an ejector device within the ejector housing and viewable from the end of the ejector housing at which the cover is attached.

8 Claims, 2 Drawing Sheets

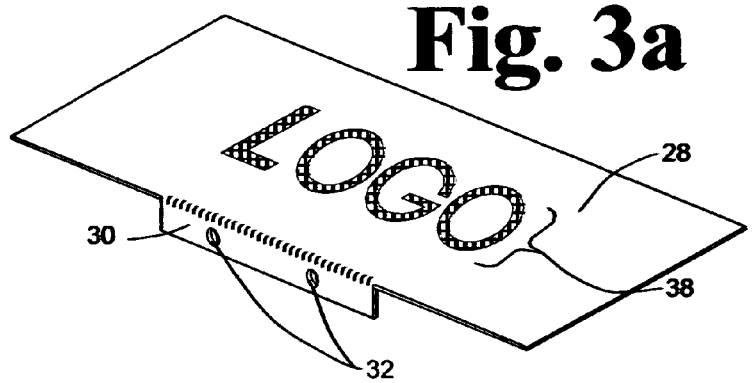
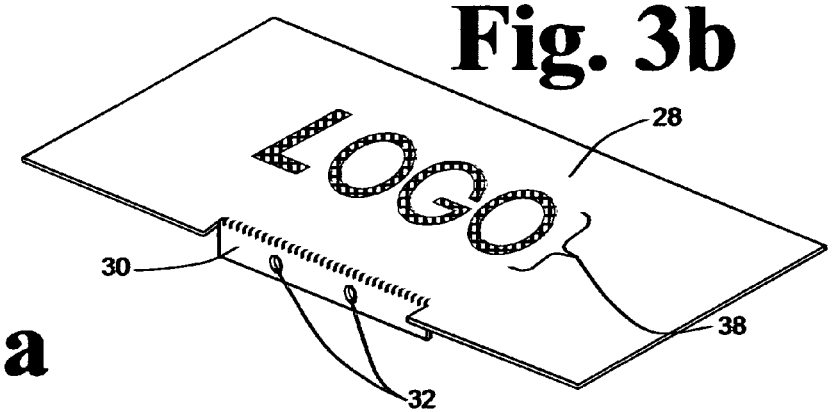
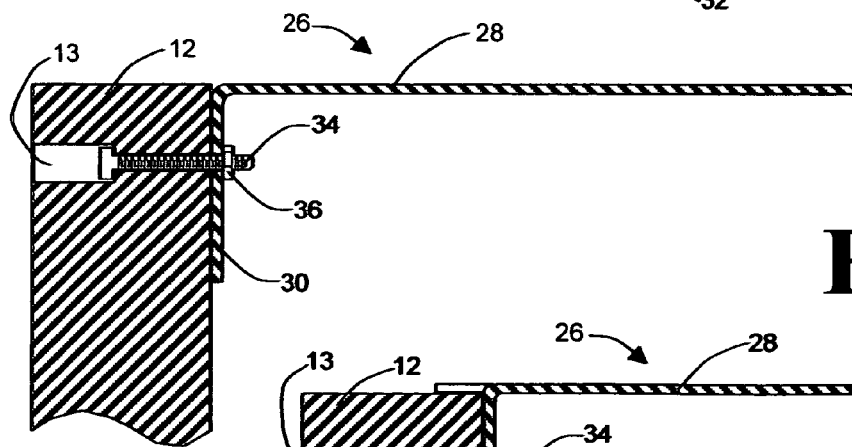
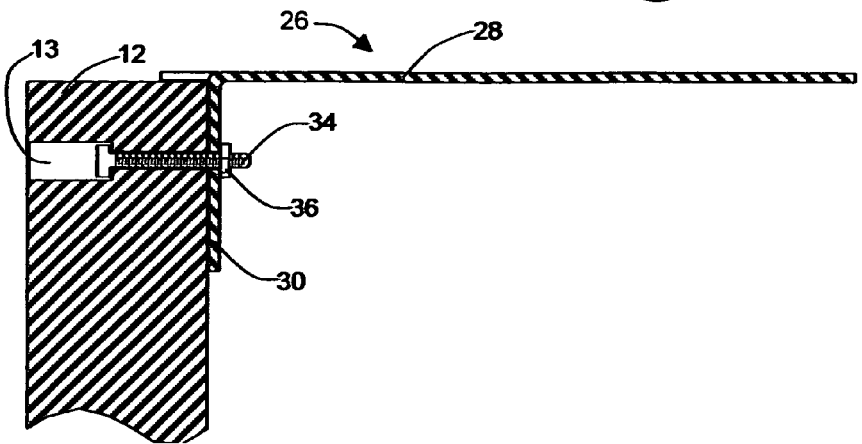

APPARATUS FOR INJECTION MOLDING

I. BACKGROUND OF THE INVENTION

1. Field of the Invention

This invention relates generally to molding. In particular, this invention relates to mold assemblies having ejector device housings.

2. Description of Related Art

It is known in the art of molding, for example injection molding, to use mold assemblies comprising mating mold components defining one or more mold cavities. In addition to the mating mold components, mold assemblies comprise mounting sub-assemblies constructed for mounting to members of the press or clamp unit of a molding machine, the clamp unit being operated to close the mold assembly for molding and open the mold assembly to remove molded articles. It is further known to provide mold assemblies having ejector devices for dislodging molded material from the mating mold components. Advantageously, components of the ejector device are surrounded on at least four sides by members of a mounting sub-assembly defining a so-called "ejector housing 5" or "ejector box". Referring to FIG. 1, a mold sub-assembly 10 comprises an assembly mounting plate 12, right and left side die retention plates 14 and 16, respectively, and a die mounting plate 18 for supporting a mold component. As shown, left and right side die retention plates space die mounting plate 18 from assembly mounting plate 12. Advantageously, left and right side retention plates have grooves for receiving projecting ears of die mounting plate 18 facilitating removal and insertion of die mounting plates with mold components attached from and into a subassembly of assembly mounting plate 12 and die retention plates 14 and 16. Elements of an ejector device are movably supported within the ejector housing 5 created by assembly mounting plate 12, die retention plates 14 and 16 and die mounting plate 18. Ejector device elements within the ejector housing 5 comprise ejector pins 20, ejector plate 24 for supporting ejector pins 20 and pin retainer plate 22 for retaining ejector pins 20 on ejector plate 24. Ends of ejector pins 20 pass through die mounting plate 18 and protrude into a mold component mounted thereto. Movement of ejector plate 24 toward die mounting plate 18 advances the projecting ends of ejector pins 20 to dislodge a molded article and sprue from the mold component mounted thereon. Commonly, one or more ejector rods (not shown) pass through openings in assembly mounting plate 12 and engage the assembly of ejector plate 20 and pin retainer plate 22 to effect movement thereof. As shown, functional elements of assembly mounting plate 12 and die retention plate 18 involve surfaces, bores and the like machined in the faces of the plates or through the plates. Similarly, functional elements of die retention plates 14 and 16 involve surfaces, bores and the like machined in the faces thereof. The manufacture of these plates does not require machining in or of the ends thereof other than to produce plates of the desired overall dimensions. Hence, the machining of these plates can be completed without arranging the plate being machined to perform machining operations into the ends thereof.

The ejector housing 5 is advantageously open on at least one side of the sub-assembly, the periphery of the openings of the ejector housing being defined by ends of mold assembly members defining the ejector housing. Advantageously at least one opening of the ejector housing is left exposed or accessible through openings in the machine as the sub-assembly is mounted to a machine member. Hence, with the sub-assembly installed in a molding machine press, access is provided to the ejector device components within the ejector housing 5 through the ejector housing opening. It is known to provide ejector housing covers for covering, at least partially, the openings of ejector housing 5 to allow guarded examination of the interior of the ejector housing. Such covers are provided with openings through which an examination can be made but which are effective to block a user from reaching pinch points within the housing. Known ejector housing covers are attached to the mold assembly by fasteners accessible from the face of the cover. Hence the fasteners engage the ends of the mold assembly members defining the ejector housing 5, requiring machining into those ends. This arrangement presents a disadvantage in the manufacture of the mold assembly members since the required machining necessitates a set-up different from set-ups used for other machining operations performed on the mold assembly members. Further, the known arrangement for attaching the ejector housing cover allows removal of the cover with the mold assembly installed in a machine, increasing the potential for operation of the machine with the ejector housing cover removed.

II. SUMMARY OF THE INVENTION

It is an object of the present invention to provide a cover for an opening of an ejector housing of a mold assembly, the cover being attachable to members of the mold assembly by means accessible only from sides of the members defining the ejector housing preventing removal of the ejector housing cover with the mold assembly installed in a machine.

It is a further object of the present invention to provide a mold assembly comprising covers for openings of an ejector housing, the covers being attached by means accessible only from sides of the sides of the members of the mold assembly defining the ejector housing preventing removal of the ejector housing covers with the mold assembly installed in a machine.

Further objects and advantages of the invention shall be made apparent from the accompanying drawings and the following description thereof.

In accordance with the aforesaid objects the present invention provides a cover for an ejector housing, the ejector housing comprising members of the mold assembly surrounding ejector devices and being open on at least one side, the ends of the members defining the periphery of the openings of the ejector housing, the cover comprising a cover portion and a mounting portion for attachment to a member of the mold assembly comprising a side of the ejector housing, the mounting portion being attached to the member on a side thereof comprising an interior wall of the ejector housing and the cover portion covering an opening of the ejector housing defined by the ends of the members surrounding the ejector housing. Further, the present invention provides a mold assembly comprising members defining an ejector housing surrounding ejector devices, the housing being open on at least one side, the ends of the members defining the periphery of the openings of the ejector housing, a cover comprising a cover portion and a mounting portion for attachment to a member of the mold assembly comprising a side of the ejector housing, the mounting portion being attached to the member on a side thereof comprising an interior wall of the ejector housing and the cover portion covering an opening of the ejector housing.

III. BRIEF DESCRIPTION OF THE DRAWINGS

FIGS. 3a and 3b are three-dimensional view of ejector housing covers in accordance with the first and second embodiments of the present invention.

FIGS. 4a and 4b are partial sectional views showing attachment of ejector housing covers of the invention to a mold assembly.

IV. DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Figure 1:
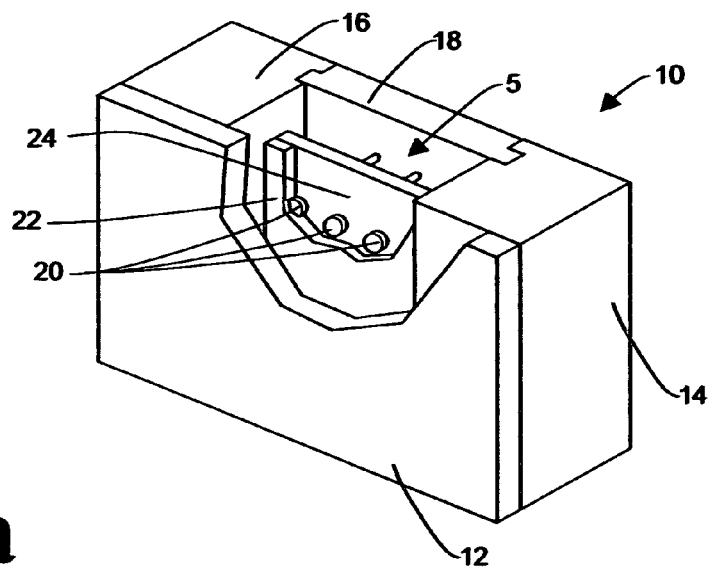
FIG. 1 is a three dimensional view of a mold sub-assembly having an ejector housing.
Figure 2A:
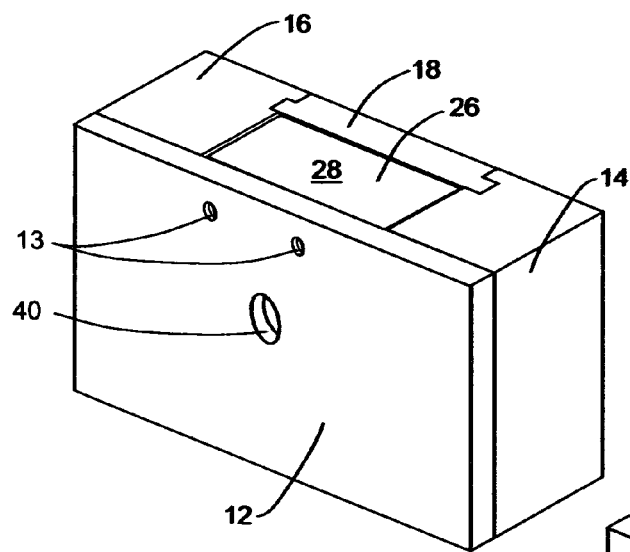
FIG. 2a shows the sub-assembly of FIG. 1 with an ejector housing cover in accordance with a first embodiment of the present invention.
Figure 2B:
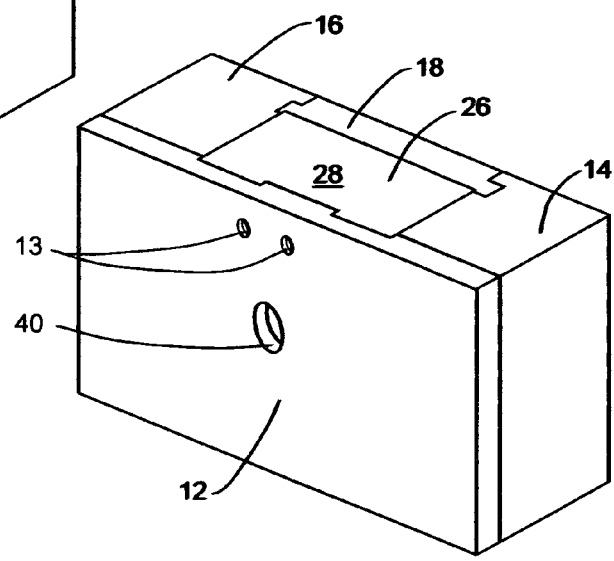
FIG. 2b shows the sub-assembly of FIG. 1 with an ejector housing cover in accordance with a second embodiment of the present invention.

Referring to FIGS. 2a and 2b, mold subassembly 10 is shown with alternative embodiments of an ejector housing cover in accordance with the invention mounted thereto. An ejector rod bore 40 in assembly mounting plate 12 is depicted in FIGS. 2a and 2b, bore 40 allows an ejector rod to pass through assembly mounting plate 12 to engage the assembly of ejector plate 20 and pin retainer plate 22 within ejector housing 5. Referring to FIG. 2a, cover portion 28 of cover 26 is flush with the ends of assembly mounting plate 12, die mounting plate 18 and die retention plates 14 and 16 defining the periphery of the opening of ejector housing 5. Cover portion 28 advantageously has a size and shape to fit within the periphery of the opening of ejector housing 5. Cover 26 is attached to assembly mounting plate 12 by fasteners passing therethrough at holes 13 and engaging a mounting portion 30 (FIG. 3a) of cover 26. Referring to FIG. 2b, cover portion 28 of cover 26 overlaps ends of one or more of assembly mounting plate 12, die mounting plate 18 and die retention plates 14 and 16. As shown in FIG. 2b, cover 26 is attached to assembly mounting plate 12 by fasteners passing therethrough at holes 13 and engaging a mounting portion 30 (FIG. 3b) of cover 26. Holes 13 of FIGS. 2a and 2b are advantageously machined in assembly mounting plate 12 using a set-up thereof used for other machining operations to be performed thereon.

Referring to FIG. 3a, a first embodiment of ejector housing cover 26 of the invention comprises cover portion 28 and mounting portion 30. Cover portion 28 is substantially of the same size and shape as the opening of ejector housing 5. Mounting holes 32 in mounting portion 30 are located to position cover portion 28 to be flush with the ends of assembly mounting plate 12, die mounting plate 18 and die retention plates 14 and 16 at the opening of ejector housing 5 (see FIGS. 2a and 4a). Openings through the cover permitting guarded examination of the interior ejector housing 5 are shown arranged in a pattern such as a logotype. The size, location and appearance of the opening is chosen to permit examination of ejector components viewable from the open end of ejector housing 5 and to effectively block a user from reaching pinch points within ejector housing 5.

Referring to FIG. 3b, a second embodiment of the ejector housing cover 26 of the invention comprises cover portion 28 and mounting portion 30. Cover portion 28 is of a size and shape to overlap at least a portion of the end of at least one of the assembly mounting plate 12, die mounting plate 18 and die retention plates 14 and 16 at the opening of the ejector housing 5. Mounting holes 32 in mounting portion 30 are located to position cover portion 28 so the overlapping extension thereof is on or slightly above the portion of the ends of assembly mounting plate 12, die mounting plate 18 and die retention plates 14 and 16 overlapped by cover portion 28 (see FIGS. 2b and 4b).

Referring to FIGS. 4a and 4b, mounting of cover 26 in accordance with either the first or second embodiment is illustrated in partial section. Mounting portion 30 is fixed to a side of assembly mounting plate 12 comprising an interior wall of ejector housing 5. Mounting portion 30 is advantageously attached with fasteners such as screw 34 passing through assembly mounting plate 12 at hole 13 and engaging mounting portion 30. Screws 34 may engage threads in holes 32 of mounting portion 30 or threads of mating nuts such as nut 36. Other fasteners may be substituted, including fasteners comprising captive elements that are retained by at least one of assembly mounting plate 12 and mounting portion 30. While illustrated as being attached to assembly mounting plate 12, it is contemplated that alternative arrangements of mounting portion 30 may be adapted to allow fastening of cover 26 to any of assembly mounting plate 12, die mounting plate 18 and die retention plates 14 and 16. In all cases, mounting portion 30 is fixed to a side of one of plates 12-18 comprising an interior wall of ejector housing 5 and the fasteners are located in the sides where they are not normally accessible with mold assembly 10 mounted in a press unit of a machine. Hence, cover 26 is attached so that the attaching fasteners are not accessible for removing the housing cover with the mold assembly 10 installed in a machine. Elements such as holes 13 for mounting cover 26 to any of the plates 12-18 are advantageously produced in the same set-ups of the plates used for machining other elements thereon.

While illustrated as being comprised of separate members including assembly mounting plate 12, die mounting plate 18 and die retention plates 14 and 16, it is contemplated that the members comprising the ejector housing 5 may comprise unitary combinations. For example, mounting plate 12 and die retention plates 14 and 16 may comprise a unitary member to which die mounting plate 18 is assembled. Likewise, die mounting plate 18 and die retention plates 14 and 16 may comprise a unitary member to which die mounting plate 18 is assembled. Although the ejector housing cover 26 is illustrated as being applied to only one end of ejector housing 5, it is contemplated that ejector housing 5 may be open at opposite ends and that an ejector housing cover 26 would be applied to members of the mold assembly to cover both ejector housing openings. It is contemplated that ejector housing covers in accordance herewith advantageously include openings in cover portion 28 to provide ventilation of ejector housing 5 and to permit viewing thereinto.

What is claimed is:

1. A cover for an opening of an ejector housing of a mold assembly, the ejector housing comprising members of the mold assembly surrounding ejector devices and being open on at least one side, the ends of the members defining the periphery of the openings of the ejector housing, the cover comprising a cover portion and a mounting portion for attachment to a member of the mold assembly comprising a side of the ejector housing, the mounting portion being attached to the member on a side thereof comprising an interior wall of the ejector housing by at least one fastener passing through the member and engaging the mounting portion, the fastener located so as not to be accessible with the mold assembly mounted in the clamp unit of a machine and the cover portion covering an opening of the ejector housing defined by the ends of the members surrounding the ejector housing.

2. The cover of claim 1 wherein the cover is mounted to the member so that the cover is substantially flush with the ends of the members surrounding the ejector housing opening.

3. The cover of claim 1 wherein the cover is mounted to the member so that at least a portion of at least one side of the cover portion overlaps a portion of an end of at least one of the members surrounding the ejector housing.

4. The cover of claim 1 wherein the cover comprises at least one opening therethrough permitting guarded examination of ejector device components viewable from the end of the ejector housing at which the cover is attached.

5. A mold assembly comprising members defining an ejector housing surrounding ejector devices, the housing being open on at least one side, the ends of the members defining the periphery of the openings of the ejector housing, a cover comprising a cover portion and a mounting portion for attachment to a member of the mold assembly comprising a side of the ejector housing, the mounting portion being attached to the member on a side thereof comprising an interior wall of the ejector housing by at least one fastener passing through the member and engaging the mounting portion, the fastener located so as not to be accessible with the mold assembly mounted in the clamp unit of a machine and the cover portion covering an opening of the ejector housing.

6. The mold assembly according to claim 5 wherein the cover is mounted to the member so that the cover is substantially flush with the ends of the members surrounding the ejector housing opening.

7. The mold assembly according to claim 5 wherein the cover is mounted to the member so that at least a portion of at least one side of the cover portion overlaps a portion of an end of at least one of the members surrounding the ejector housing.

8. The cover of claim 5 wherein the cover comprises at least one opening therethrough permitting guarded examination of ejector device components viewable from the end of the ejector housing at which the cover is attached.

* * * * *